(12) United States Patent
Keizer et al.

(10) Patent No.: US 8,979,070 B2
(45) Date of Patent: Mar. 17, 2015

(54) CLAMSHELL HOUSING FOR DISPENSING TUBE OF METERING DISPENSER

(76) Inventors: William Keizer, Brantford (CA); Mark Stouffer, Brantford (CA)

( * ) Notice: Subject to any disclaimer, the term of this patent is extended or adjusted under 35 U.S.C. 154(b) by 502 days.

(21) Appl. No.: 13/463,804

(22) Filed: May 3, 2012

(65) Prior Publication Data

US 2012/0261538 A1  Oct. 18, 2012

Related U.S. Application Data

(63) Continuation-in-part of application No. 12/880,016, filed on Sep. 10, 2010, now abandoned.

(51) Int. Cl.
*F16K 27/08* (2006.01)
*F16K 7/04* (2006.01)
*F16K 31/06* (2006.01)
*F16K 7/06* (2006.01)

(52) U.S. Cl.
CPC . *F16K 7/04* (2013.01); *F16K 31/06* (2013.01); *F16K 31/0644* (2013.01); *F16K 31/0672* (2013.01); *F16K 7/06* (2013.01)
USPC ............. 251/367; 248/221.11; 248/316.4; 248/316.5; 285/373; 285/419

(58) Field of Classification Search
USPC .............. 251/96, 98, 367, 369; 138/99; 248/221.11, 316.1, 316.4, 315.5, 419, 248/68.1, 74.1; 403/330; 285/373, 419
See application file for complete search history.

(56) References Cited

U.S. PATENT DOCUMENTS

| 1,649,752 | A | * | 11/1927 | Gunnard | 285/419 |
|---|---|---|---|---|---|
| 1,693,081 | A | * | 11/1928 | Kass | 285/419 |
| 1,928,316 | A | * | 9/1933 | Muto | 285/373 |
| 3,643,986 | A | * | 2/1972 | Allan | 285/197 |
| 3,776,579 | A | * | 12/1973 | Gale | 285/233 |
| 4,064,909 | A | * | 12/1977 | Neward | 251/367 |
| 4,428,496 | A | * | 1/1984 | Sardano | 220/300 |
| 4,465,310 | A | * | 8/1984 | Archer | 285/373 |
| 5,640,991 | A | * | 6/1997 | King | 285/197 |
| 6,913,294 | B2 | * | 7/2005 | Treverton et al. | 285/406 |
| 7,350,834 | B2 | * | 4/2008 | Ryhman et al. | 285/406 |

OTHER PUBLICATIONS

A.C. Dispensing Equipment Inc.; Refrigerated Liquid Dispensers SureShot flexoshot Service Manual; p. 3, 7-10, 17, 23, 27, 29, 31-33.
A.C. Dispensing Equipment Inc.; AC10-PC Refrigerated Liquid Dispensers Service Manual; p. 2, 6-8, 10-12, 17, 19, 26, 31, 35-38.
A.C. Dispensing Equipment Inc.; SureTouch Refrigerated Liquid Dispensers SureShot intellishot SureShot flexoshot Operations Manual; p. 1-2, 6-7, 12-16, 18-20.
A.C. Dispensing Equipment Inc.; Refrigerated Liquid Dispensers SureShot intellishot SureShot unishot SureShot flexoshot Operations Manual; p. 2, 4, 8-12, 18-21, 28, 30-32, 34.

* cited by examiner

*Primary Examiner* — John Bastianelli
(74) *Attorney, Agent, or Firm* — Steven M. Greenberg; CRGO Law

(57) ABSTRACT

A housing for a dispensing tube of a metering dispenser comprises a mounting half and a strike half carried by the mounting half. A channel for a dispensing tube is defined in the mounting half, and a plunger aperture is defined through the channel. The strike half pivots, relative to the mounting half, between a first pivotal position at least partially covering the channel and a second pivotal position exposing the channel and also slides relative to the mounting half, at least when the strike half is in the first pivotal position, between a first slide position obstructing pivotal movement of the strike half out of the first pivotal position and a second slide position permitting such movement. When the strike half is in the first pivotal position and the first slide position, a plunger strike surface on the strike half is in registration with and facing the plunger aperture.

5 Claims, 11 Drawing Sheets

CLAMSHELL HOUSING FOR DISPENSING TUBE OF METERING DISPENSER

CROSS-REFERENCE TO RELATED APPLICATION

This application claims priority to U.S. patent application Ser. No. 12/880,016 filed on Sep. 10, 2010, the teachings of which are hereby incorporated by reference.

TECHNICAL FIELD

The present disclosure relates to metering dispensers, and more particularly to housings for holding the flexible dispensing tube of a metering dispenser in place for a plunger that opens and closes the tube.

BACKGROUND

Solenoid-driven metering systems are well known in the food service arts, and are used for metered dispensing of liquids such as cream and milk, and granular solids such as sugar, for beverages such as coffee and tea. Such systems are sold under the trademark SureShot Dispensing Systems® by A.C. Dispensing Equipment Inc., having an address at 100 Dispensing Way, Lower Sackville, Nova Scotia, Canada B4C 4H2.

FIGS. 1 to 2B show an exemplary prior art solenoid-driven metering system 10. The metering system 10 comprises a flexible dispensing tube 12, a plastic housing 14 surrounding a portion of the dispensing tube 12, and a solenoid plunger 16. Other components of the solenoid-driven metering system, such as the solenoid itself, related control systems, the support structure and other elements have been omitted for clarity of illustration; these elements and their placement will be apparent to one skilled in the art.

Referring specifically to FIG. 1, an upper end 12A of the dispensing tube 12 communicates with a reservoir of the material to be metered (not shown) and a lower end 12B communicates with an outlet (not shown), which may simply be an open end of the dispensing tube 12. In a typical example, the reservoir is a flexible plastic bag containing milk or cream which is sealed except that it opens into an attached dispensing tube 12 to allow the milk or cream to be dispensed. The dispensing tube 12 is arranged generally vertically, with the upper end 12A above the lower end 12B, so that material will flow downwardly through the tube from the upper end 12A to the lower end 12B under the influence of gravity, unless the dispensing tube 12 is constricted.

The housing 14 comprises two opposed halves 14A, 14B removably hingedly secured to one another in a clamshell arrangement by a hinge 18 and securable around the dispensing tube 12 in a closed configuration. Two opposed channels 20A, 20B defined in the tube-receiving faces of the two opposed halves 14A, 14B cooperate to define a vertical passageway 20 through the housing 14 for the dispensing tube 12. The half 14A of the housing 14 facing the solenoid plunger 16 has a plunger aperture 22 which exposes the dispensing tube 12. The housing 14 is maintained in the closed configuration by a thumbscrew 19 that is rotatably journalled in a bore (not shown) through the half 14B of the housing 14 that does not face the solenoid plunger 16 and is threadedly received in a correspondingly positioned threaded aperture 21 (FIG. 1) in the half 14A facing the solenoid plunger 16. The threaded aperture 21 is formed in a metal insert 23 which is in turn secured in a larger aperture in the half 14A facing the solenoid plunger 16, so as to provide improved strength relative to the plastic from which the housing 14 is formed.

Typically, a temperature sensor insert 17 formed from aluminum is installed in the channel 20A in the half 14A facing the solenoid plunger 16. The insert 17 carries a temperature sensor such as a thermistor (not shown) and engages the dispensing tube 12 so that the insert 17 will assume the approximate temperature of the material in the dispensing tube 12 and allow this temperature to be detected by the temperature sensor.

The solenoid plunger 16 comprises a solenoid-actuable armature shaft 24 and a plunger head 26 secured to one end of the armature shaft 24. The plunger head 26 is formed from plastic and comprises a base 28 secured to the armature shaft 24, four support members 30, a disc-shaped portion 32 and a closure member 34. The support members 30 are ogee-shaped and arranged in cruciform relation to one another, and extend outwardly from the base 28 to support the disc-shaped portion 30, which in turn supports the closure member 34.

When assembled, the plunger aperture 22 in the half 14A of the housing 14 facing the solenoid plunger 16 is in registration with the closure member 34 on the plunger head 26.

In operation, as shown in FIGS. 2A and 2B, the solenoid plunger 16 is arranged for reciprocal motion toward and away from the housing 14 under the control of the solenoid (not shown).

The "resting" or "closed" position of the solenoid plunger 16 is shown in FIG. 2A; in this position the closure member 34 on the plunger head 26 has been received in the plunger aperture 22 in the half 14A of the housing 14 facing the solenoid plunger 16, and the plunger 16 may be maintained in this position by, for example, a suitable biasing member such as a spring (not shown). In this position, the closure member 34 compresses the dispensing tube 12 and pinches it against the back wall 36 of the passageway 20 defined by the channels 20A, 20B (FIG. 1) in the two halves 14A, 14B of the housing 14. This pinching of the dispensing tube 12 substantially completely obstructs the dispensing tube 12, inhibiting material flow past the closure member 34. Typically, the half 14B opposite the half 14A having the plunger aperture 22 includes a strike plate (not shown) for the plunger, typically formed from aluminum, that is integrated into the back wall 36 of the passageway to be in registration with the plunger aperture 22.

When it is desired to dispense material, the solenoid (not shown) is actuated to move the solenoid plunger 16 into the "active" or "open" position, as shown in FIG. 2B, for a fixed period of time before disengaging the solenoid and allowing the solenoid plunger 16 to return to the "rest" or "closed" position shown in FIG. 2A. During the period of time that the solenoid plunger 16 is in the "active" or "open" position (FIG. 2B), the dispensing tube 12 is unobstructed and a predetermined volume of liquid or granular material is able to move past the position of the solenoid plunger 16 before the dispensing tube 12 is again obstructed as the solenoid plunger 16 returns to the "rest" or "closed" position (FIG. 2A).

The plunger head 26 is secured to the armature shaft 24 by way of a tab 38 extending from the base 28 of the plunger head 26 and which is received in a corresponding slot 40 at the end of the armature shaft 24 and held in place by a rivet 42.

When a reservoir of the material being metered, such as a bag of cream or milk, is empty and must be replaced, a user will unscrew the thumbscrew 19 and then separate the two opposed halves 14A, 14B by pivoting the half 14B having the thumbscrew 19 away from the other half 14A, which is mounted to the dispenser, so as to expose the dispensing tube 12. This enables the user to remove the empty bag and its associated dispensing tube 12 and install a new, full bag and insert the associated new dispensing tube 12 into the channel 20A. The user then pivots the half 14B having the thumbscrew 19 back toward the other half 14A, trapping the new dispensing tube 12 in the vertical passageway 20, and then screws the thumbscrew 19 back into the threaded aperture 21. This procedure is time consuming, especially in the context of a quick-service restaurant, where seconds count and customers expect to be served in less than a minute. Moreover, with repeated use, the thumbscrew 19 may develop a tendency to bind in the threaded aperture 21, making it more difficult to screw and unscrew and thereby increasing both the difficulty of changing the reservoir as well as the time required to do so.

In addition, the barrel portions 18B of the plastic hinge 18 joining the two halves 14A, 14B are prone to breakage, as shown by the arrow "B" in FIG. 2. Such breakage requires that the entire housing 14 be replaced, necessitating a costly maintenance call and also requiring that the metering dispenser be taken out of service.

SUMMARY

A housing for a dispensing tube of a metering dispenser comprises a mounting half for mounting the housing to a metering dispenser and a strike half for receiving plunger strikes. The strike half is carried by the mounting half. The mounting half has a mounting half tube channel defined therein for receiving a dispensing tube and also has a mounting half tube channel for receiving a plunger, and the strike half has a plunger strike surface. The strike half is pivotally carried by the mounting half so as to be pivotable, relative to the mounting half, between a first pivotal position in which the strike half at least partially covers the mounting half tube channel and a second pivotal position in which the strike half exposes the mounting half tube channel. The strike half is further slidably carried by the mounting half so as to be slidable relative to the mounting half, at least when the strike half is in the first pivotal position, between a first slide position in which pivotal movement of the strike half relative to the mounting half from the first pivotal position toward the second pivotal position is obstructed, and a second slide position in which pivotal movement of the strike half relative to the mounting half from the first pivotal position to the second pivotal position is permitted. At least when the strike half is in the first pivotal position and in the first slide position, the plunger strike surface is in registration with and facing the plunger aperture to receive a plunger head.

In one embodiment, the strike half is hingedly carried by the mounting half by way of a pivot extending between the mounting half and the strike half and on which the strike half is rotatably received so as to be rotatable about the pivot between the first pivotal position and the second pivotal position, and the strike half is further slidable along the pivot, at least when the strike half is in the first pivotal position, between the first slide position and the second slide position.

In certain embodiments, one of the mounting half and the strike half has at least one locking finger and the other one of the mounting half and the strike half has at least one latch arm extending therefrom, with each latch arm forming a receiving slot for receiving a respective locking finger. When the strike half is in the first pivotal position and the first slide position, each locking finger is in registration with its respective latch arm, inside the receiving slot formed by the respective latch arm, so that each latch arm engages its respective locking finger to obstruct movement of the strike half from the first pivotal position toward the second pivotal position. When the strike half is in the first pivotal position and the second slide position, each locking finger is out of registration with its respective latch arm and outside of the receiving slot formed by the respective latch arm whereby movement of the strike half from the first pivotal position toward the second pivotal position is permitted.

In particular embodiments, the at least one locking finger comprises a plurality of locking fingers spaced longitudinally apart from one another to define a locking finger gap between each adjacent pair of locking fingers, and the at least one latch arm comprises a plurality of latch arms spaced longitudinally apart from one another to define a latch arm gap between each adjacent pair of latch arms. When the strike half moves between the first pivotal position and the second pivotal position while in the second slide position, at least one latch arm fits in a corresponding locking finger gap, and at least one locking finger fits in a corresponding locking arm gap.

The locking finger(s) or the latch arm(s), or both, may each have a tapered guide surface for guiding the strike half into the second slide position as the strike half moves into the first pivotal position.

In some embodiments, the strike half has a strike half tube channel defined therein, and the strike half tube channel cooperates with the mounting half tube channel, when the strike half is in the first pivotal position, to form a dispensing tube channel.

BRIEF DESCRIPTION OF THE DRAWINGS

These and other features will become more apparent from the following description in which reference is made to the appended drawings wherein.

DETAILED DESCRIPTION

Figure 2:
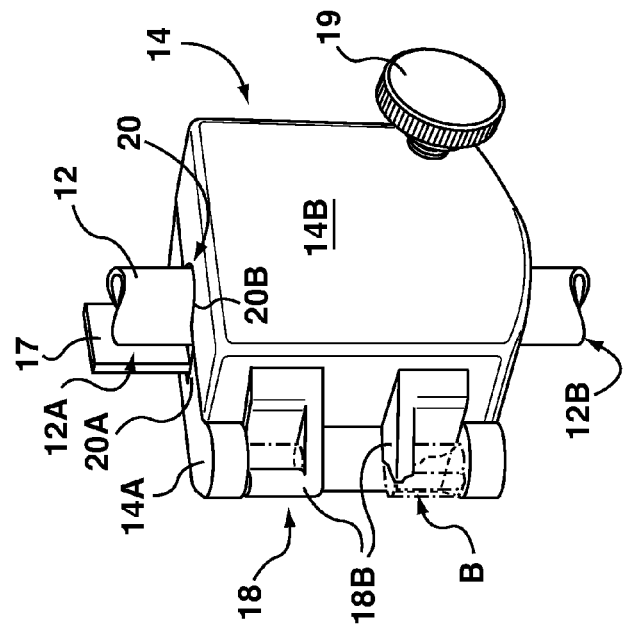
FIG. 2 is a front perspective view of the prior art metering system of FIG. 1.
Figure 1:
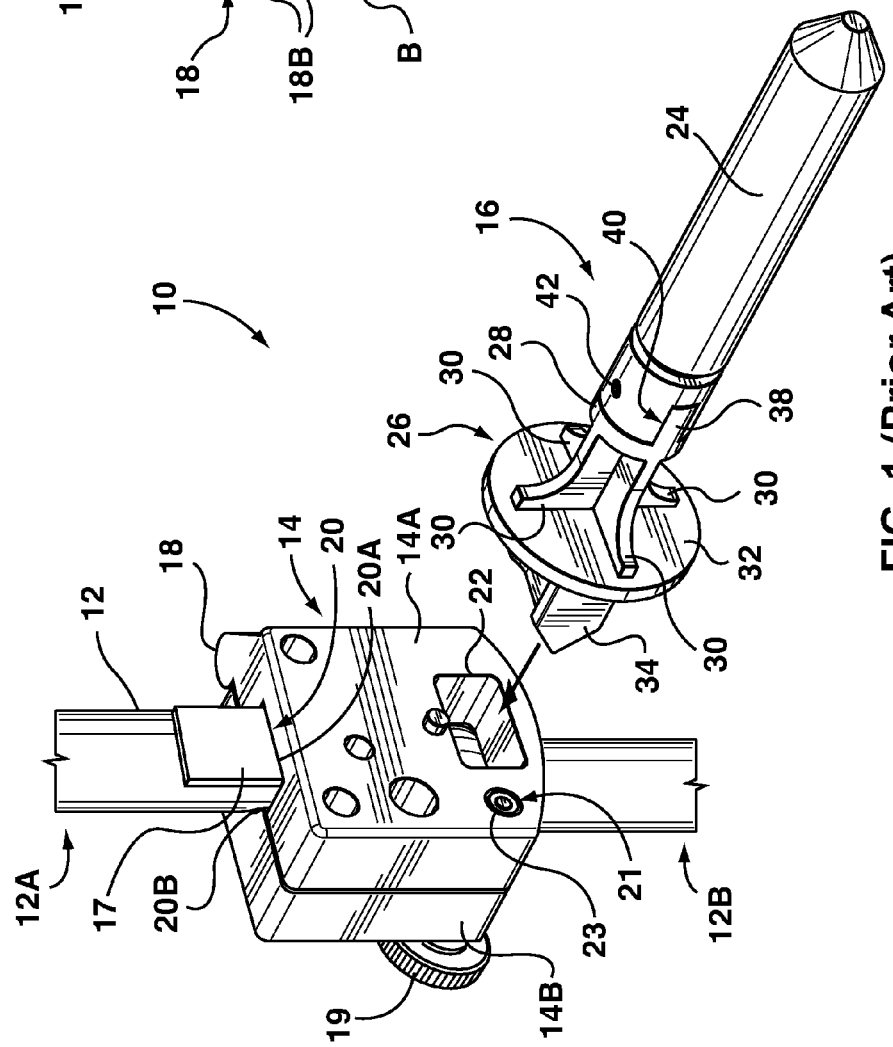
FIG. 1 is a rear perspective view showing a portion of a prior art solenoid-based metering system including a prior art solenoid plunger.
Figure 2A:
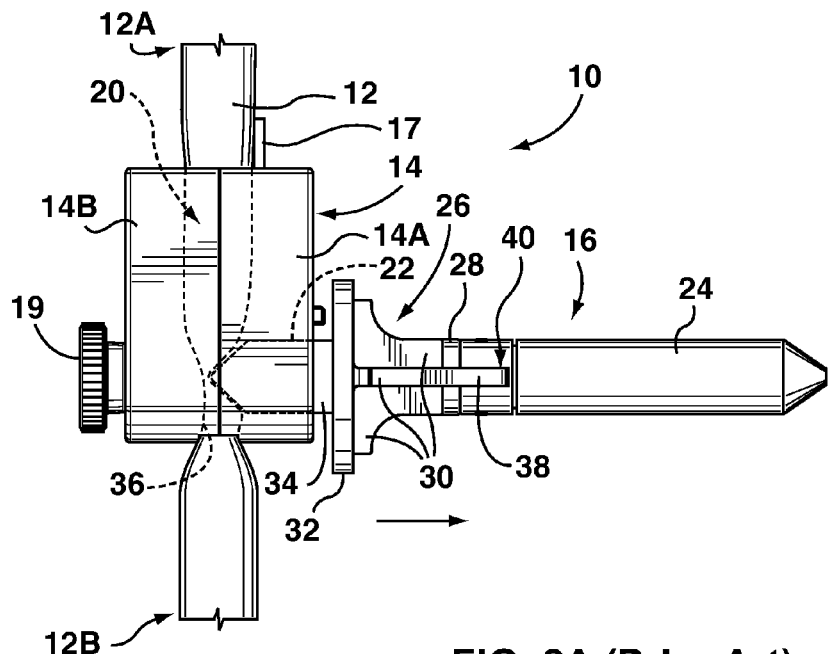
FIG. 2A is a side view of the portion of the prior art metering system of FIG. 1, showing the prior art solenoid plunger in a first position that inhibits flow of material through the prior art metering system.
Figure 2B:
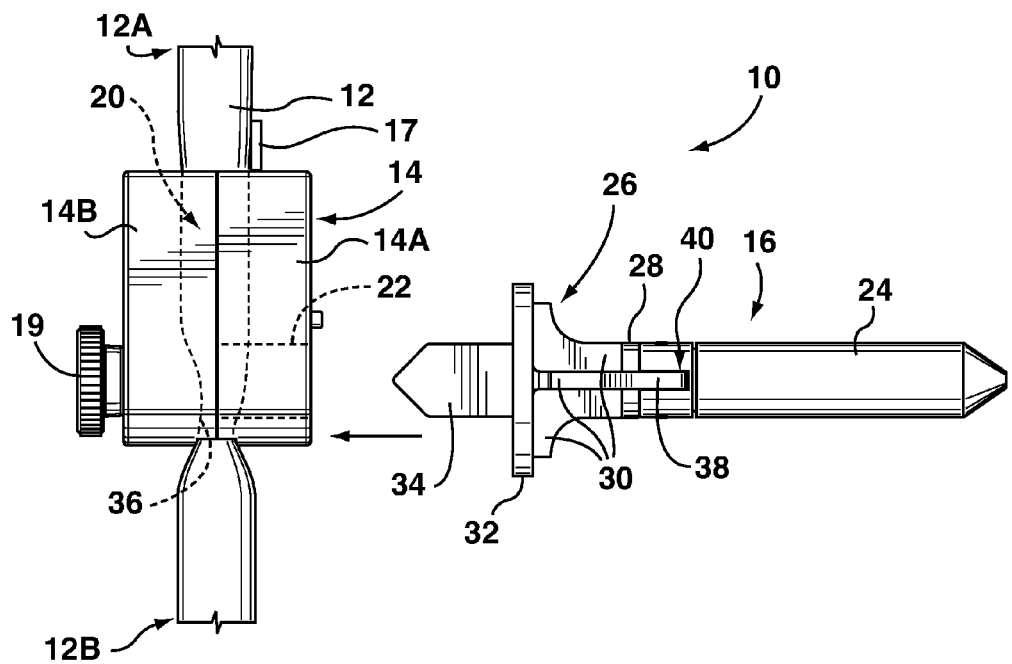
FIG. 2B is a side view of the portion of the prior art metering system of FIG. 1, showing the prior art solenoid plunger in a second position that permits flow of material through the prior art metering system.
Figure 3:
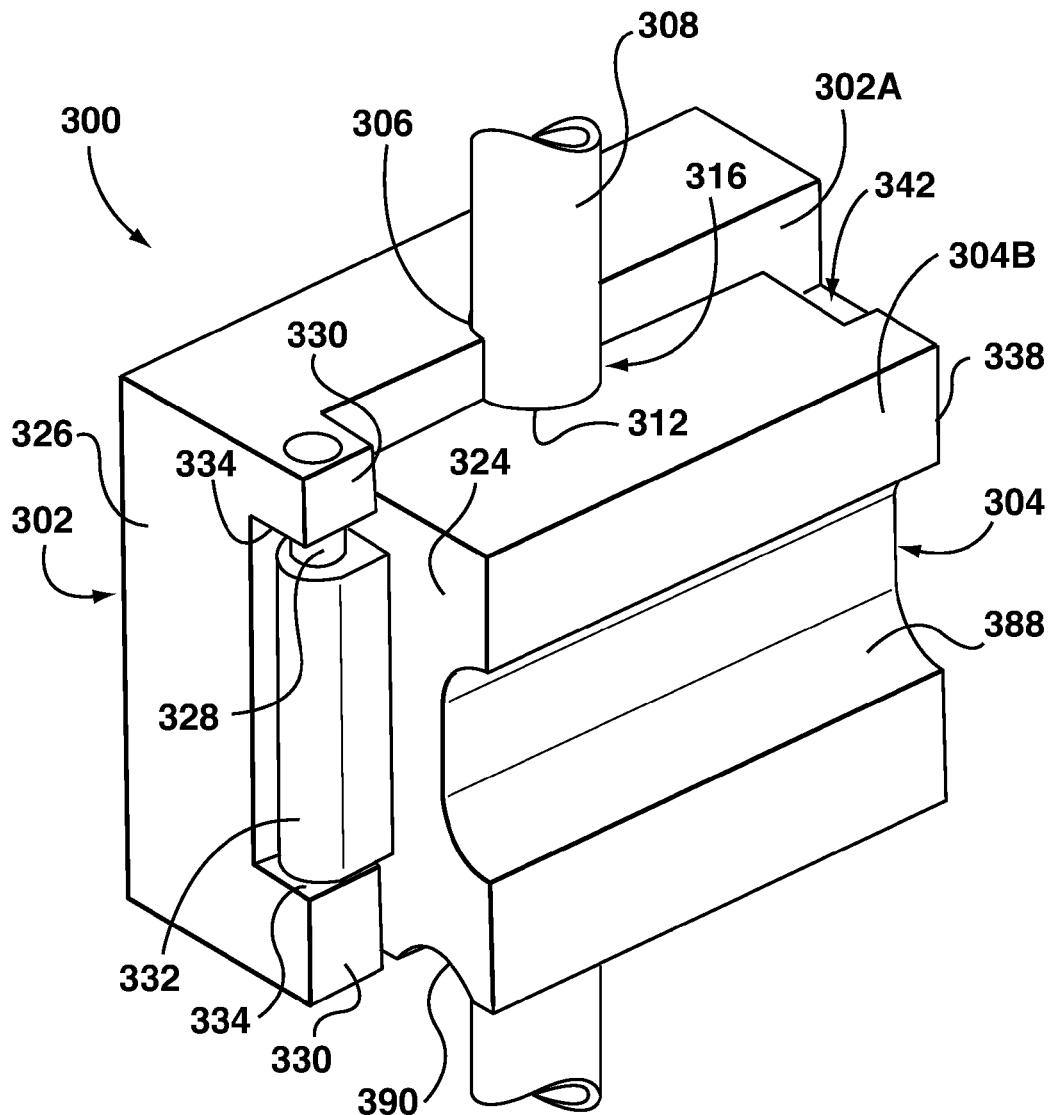
FIG. 3 is a first top perspective view of an exemplary housing for a dispensing tube of a metering dispenser, showing the housing in a closed and locked configuration.

Reference is now made to FIG. 3, which shows an exemplary housing 300 for a dispensing tube of a metering dispenser (not shown). The housing 300 comprises a mounting half 302 for mounting the housing 300 to a metering dispenser and a strike half 304 for receiving plunger strikes, with the strike half 304 being carried by the mounting half 302. The use of the terms "mounting half" and "strike half" refer to the clamshell structure of the housings described herein, and is not intended to imply that the mounting half and strike half are, or need be of equal size or identical shape. Indeed, as will be apparent from the drawings, in the exemplary illustrated embodiment the mounting half 302 has a substantially larger footprint than the strike half 304. Both the mounting half 302 and the strike half 304 are preferably monolithic and are preferably formed from metal of suitable strength, more preferably from aluminum, and most preferably from anodized aluminum. Other materials, such as plastic of suitable strength, may also be used. The mounting half 302 and the strike half 304 may be made of different materials.

Figure 4:
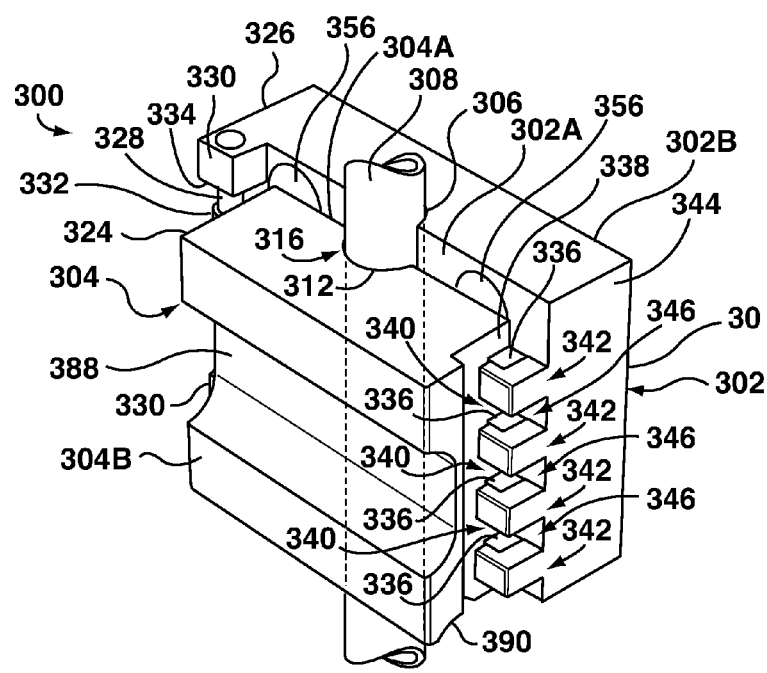
FIG. 4 is a second top perspective view of the housing of FIG. 3, showing the housing in a closed and locked configuration and showing passage of a flexible dispensing tube through the housing.
Figure 5:
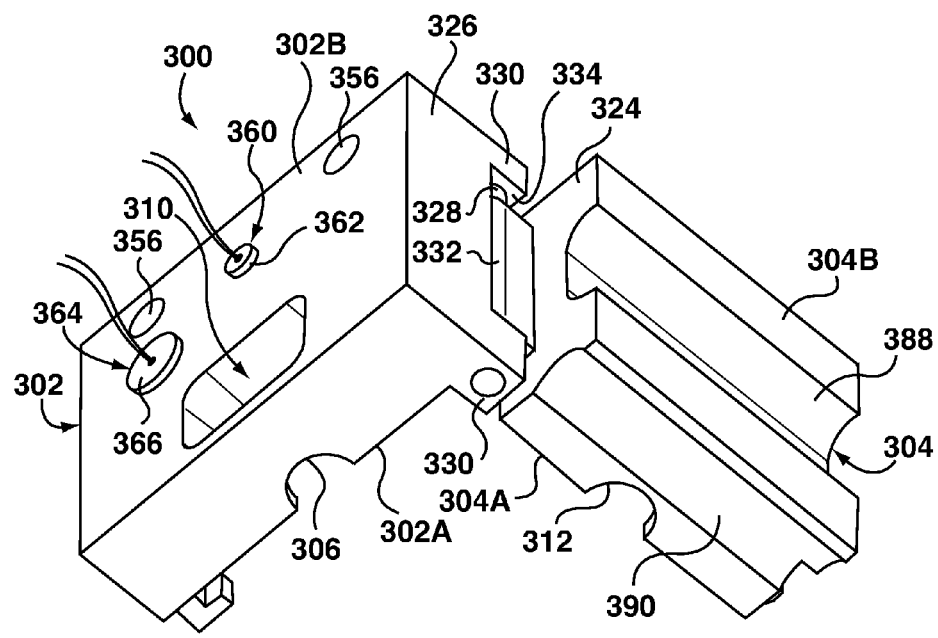
FIG. 5 is a bottom perspective view of the housing of FIG. 3, showing the housing in an open configuration.
Figure 6:
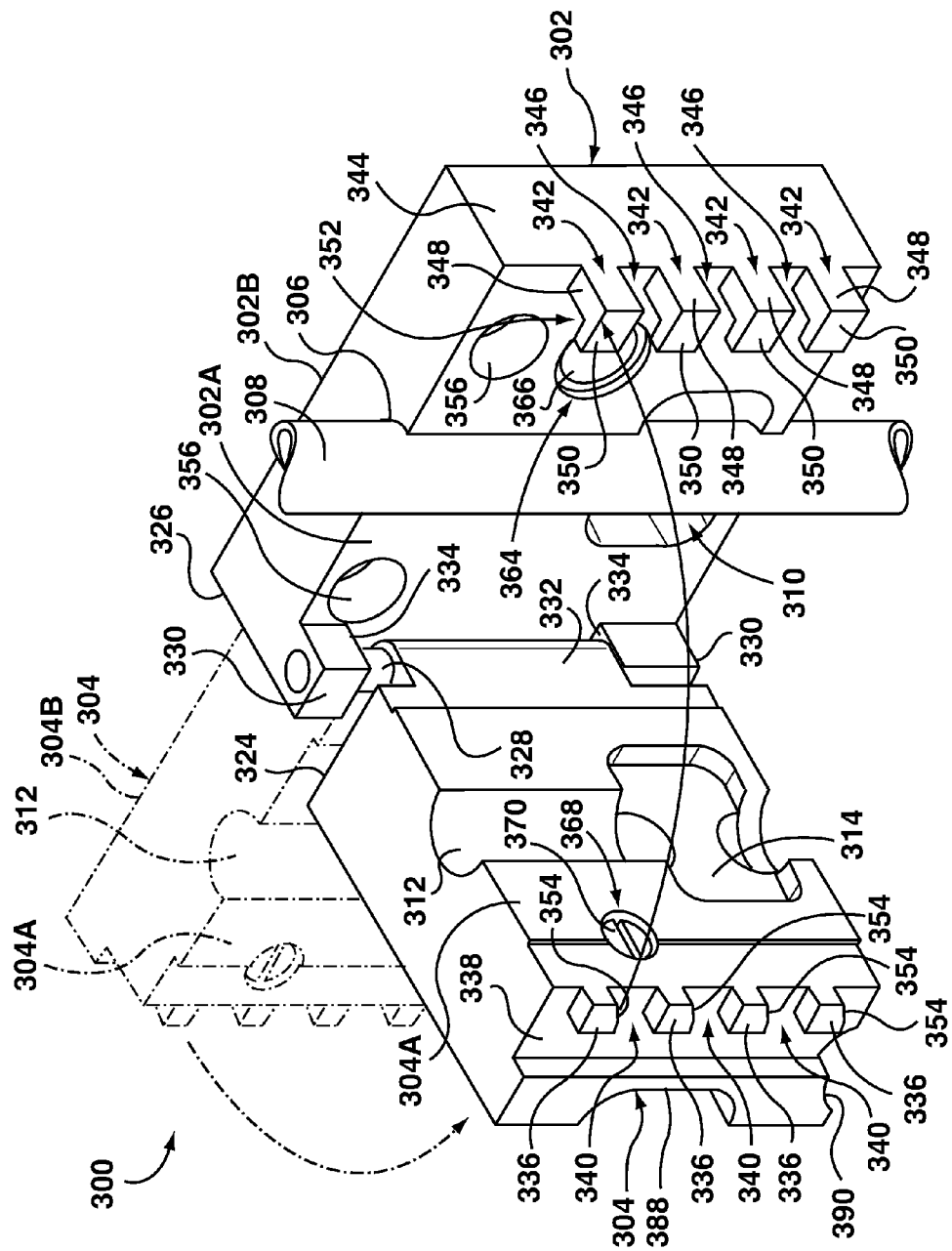
FIG. 6 is a top perspective view of the housing of FIG. 3, showing the housing in two alternate open configurations.

The strike half 304 can move relative to the mounting half 302 so that the housing 300 has a closed and locked configuration (FIGS. 3, 4, 10, 12 and 14 to 16), a closed and unlocked configuration (FIGS. 9, 11 and 13), and at least one open configuration (FIGS. 5 and 6). To enable the housing 300 to be placed into the various configurations, the strike half 304 is both pivotally and slidably carried by the mounting half 302, as described in greater detail below. The mounting half 302 and the strike half 304 each have respective tube-receiving 302A, 304A and outer faces 302B, 304B. The outer face 302B of the mounting half may be mounted to a metering dispenser, and when the housing 300 is in the closed and locked configuration and in the closed and unlocked configuration, the tube-receiving faces 302A, 304A face one another.

Figure 14:
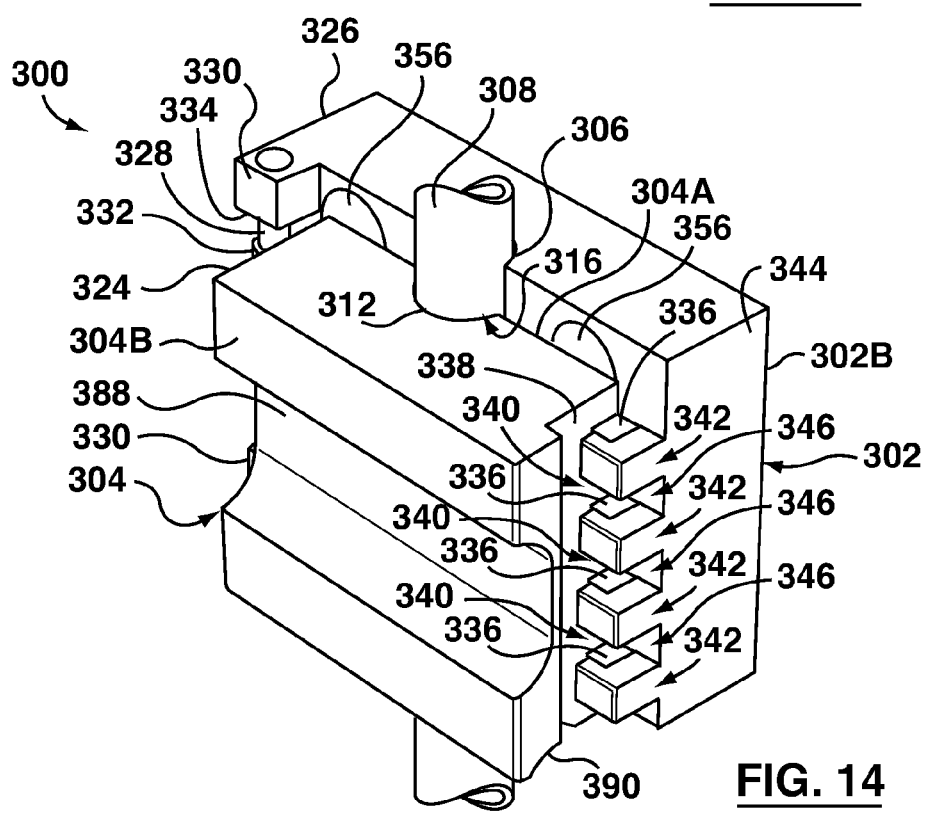
FIG. 14 is the same perspective view as in FIG. 4, showing the housing in a closed and locked configuration.
Figure 15:
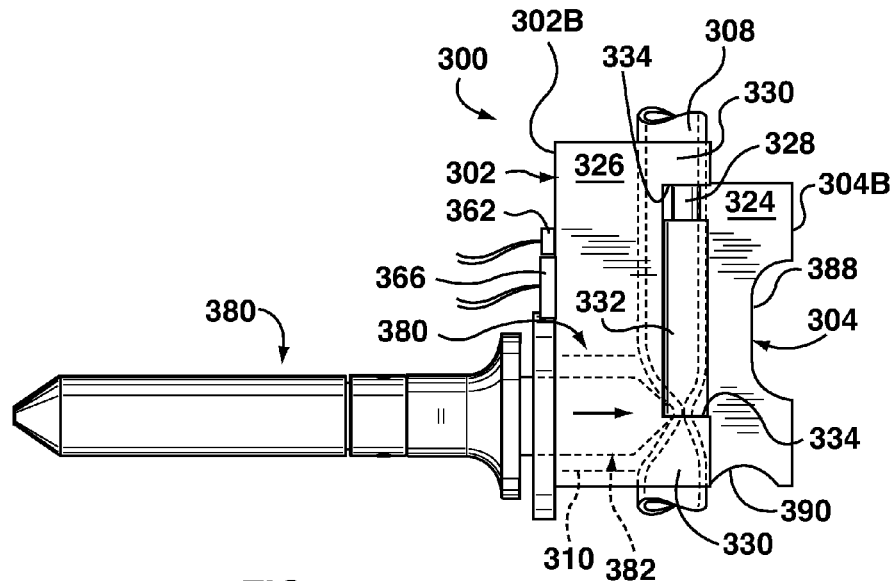
FIG. 15 is a side view of the housing of FIG. 3, showing a solenoid plunger in a "resting" or "closed" position.
Figure 16:
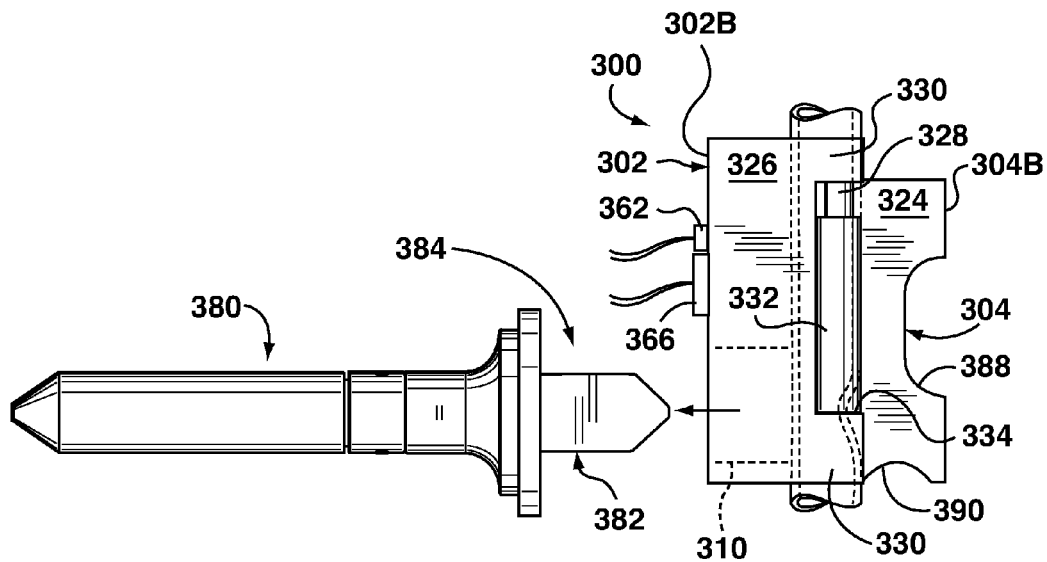
FIG. 16 is the same side view as in FIG. 15, showing the solenoid plunger in an "active" or "open" position.

As best shown in FIGS. 4 and 5, in the illustrated embodiment the mounting half 302 has a mounting half tube channel 306 defined in its tube-receiving face 302A for receiving a flexible dispensing tube 308 of the metering dispenser, and a plunger aperture 310 is defined through the mounting half 302, and in particular through the mounting half tube channel 306, for receiving a plunger 380 (see FIGS. 15 and 16). The strike half 304 has a strike half tube channel 312 defined in its tube-receiving face 304A, and has a plunger strike surface 314 (FIG. 6) on the tube-receiving face 304A interrupting the strike half tube channel 312. In the illustrated embodiment in which the mounting half 302 and the strike half 304 are made from metal, in particular anodized aluminum, the plunger strike surface 314 is preferably integral with the monolithic strike half 304; in embodiments where the strike half 304 is formed from a material not suitable for withstanding direct plunger strikes, a separate plunger strike plate may provide the plunger strike surface. While the exemplary embodiment in FIGS. 3 to 16 shows the plunger strike surface 314 as a recessed part the tube-receiving face 304A, in other embodiments the plunger strike surface may be coplanar with the remainder of the tube-receiving face aside from the strike half tube channel.

At least when the housing 300 is in the closed and locked configuration (FIGS. 3, 4, 10, 12 and 14 to 16) the strike half 302 partially covers the mounting half 302 so as to obstruct access to the mounting half tube channel 306, and the strike half tube channel 312 cooperates with the mounting half tube channel 306 to form a dispensing tube passage 316 through the housing 300. The dispensing tube passage 316 receives the dispensing tube 308 of the metering dispenser and positions the dispensing tube 308 for engagement by a plunger of the metering dispenser. Moreover, at least when the housing 300 is in the closed and locked configuration (FIGS. 3, 4, 10, 12 and 14 to 16) the plunger strike surface 314 is in registration with the plunger aperture 310 to receive a plunger head.

In other embodiments, the strike half may omit any strike half tube channel, and the mounting half tube channel may be correspondingly deeper, so that the entire dispensing tube can be accommodated within the mounting half tube channel.

As noted above, the strike half 304 is both pivotally and slidably carried by the mounting half 302. The strike half 304 is pivotally carried by the mounting half 302 so as to be pivotable, relative to the mounting half 302, between a first pivotal position in which the strike half 304 at least partially covers the mounting half tube channel 306 (FIGS. 3, 4 and 8 to 16); and a second pivotal position (FIG. 6) in which the strike half 304 exposes the mounting half tube channel 306. The strike half 304 is further slidably carried by the mounting half 302 so that, at least when the strike half 304 is in the first pivotal position, the strike half 304 is slidable, relative to the mounting half 302, between a first slide position (FIGS. 3 to 6, 10, 12 and 14 to 16) and a second slide position (FIGS. 7, 9, 11 and 13). When the strike half 304 is in the first slide position and is also in the first pivotal position (FIGS. 3, 4, 10, 12 and 14 to 16), pivotal movement of the strike half 304, relative to the mounting half 302, from the first pivotal position toward the second pivotal position is obstructed. When the strike half 304 is in the second slide position, pivotal movement of the strike half 304 relative to the mounting half 302 from the first pivotal position to the second pivotal position is permitted.

The angular distance between the second pivotal position and the first pivotal position of the strike half 304 relative to the mounting half 302 should be such that the strike half 304 exposes the mounting half tube channel 306 and hence the dispensing tube 308. As shown in solid lines in FIG. 6, in the illustrated embodiment an angular distance of about 90 degrees from the first pivotal position is sufficient for the strike half 304 to expose the mounting half tube channel 306 and the dispensing tube 308. However, in the illustrated embodiment shown in FIGS. 3 to 16, the second pivotal position of the strike half 304 relative to the mounting half 302, shown with broken lines in FIG. 6, has an angular distance slightly greater than 180 degrees from the first pivotal position. This provides greater access to the mounting half tube channel 306 for removal of an old dispensing tube 308 and installation of a new dispensing tube 308. The second pivotal position shown with broken lines in FIG. 6 is a limit position defined by engagement of the pivot-side sidewall 324 of the strike half 304 with the pivot side sidewall 326 of the mounting half 302. Alternately, if it is desired to define the second pivotal position at a lesser angular distance from the first pivotal position, such as about 90 degrees as shown in solid lines in FIG. 6, a suitable stop can be provided on one or more of the mounting half 302, the strike half 304 or the metering dispenser itself adjacent the housing 300.

Figure 11:
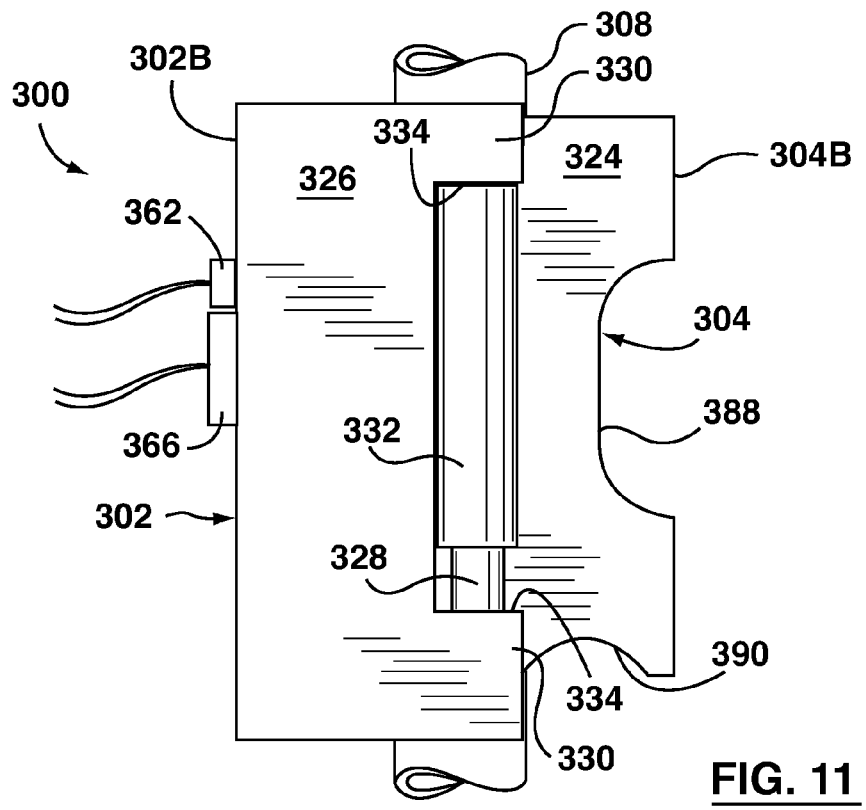
FIG. 11 is a second side view of the housing of FIG. 3, showing the housing in a closed and unlocked configuration.
Figure 12:
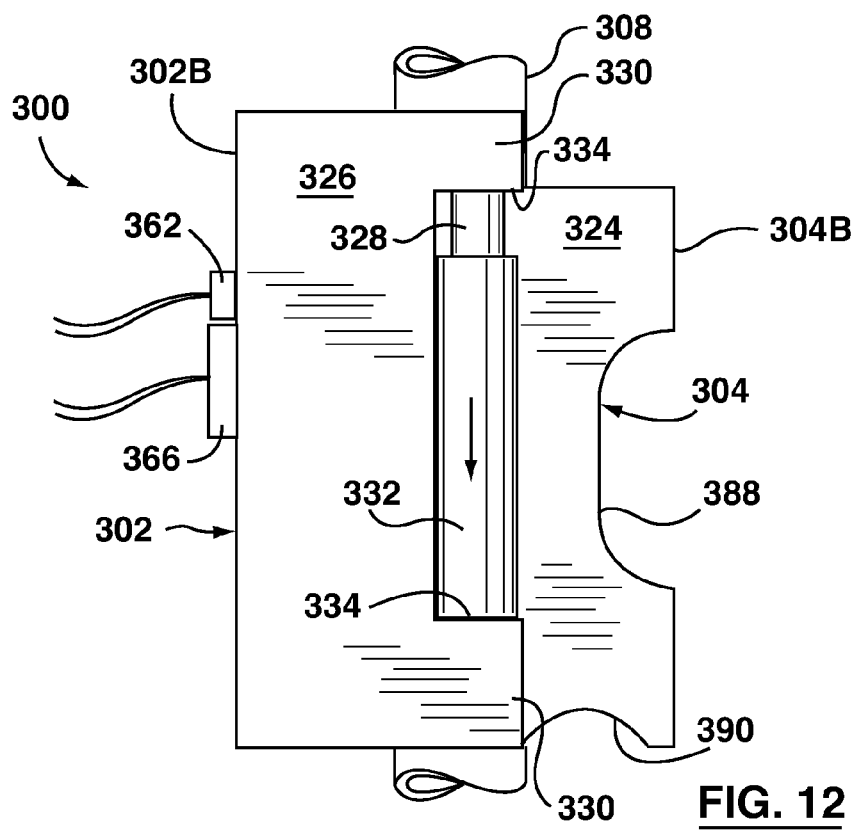
FIG. 12 is the same side view as in FIG. 11, showing the housing in a closed and locked configuration.

In the exemplary embodiment shown in FIGS. 3 to 16, the strike half 304 is hingedly carried by the mounting half 302 by way of a pivot 328 extending between the mounting half 302 and the strike half 304 and on which the strike half 304 is rotatably received so as to be rotatable about the pivot 328 between the first pivotal position and the second pivotal position. In particular, the pivot 328 is a cylindrical rod carried at its ends by two opposed pivot carriers 330 extending from the tube-receiving face 302A of the mounting half 302 adjacent the pivot-side sidewall 326 of the mounting half 302, and the pivot 328 is rotatably received in a barrel 332 extending from the pivot-side sidewall 324 of the strike half 304. As best seen in FIGS. 3, 11 and 12, the barrel 332 is shorter in length than the distance between the facing edges 334 of the pivot carriers 330, that is, the edges 334 of the pivot carriers 330 that face one another. This enables the barrel 332, and hence the strike half 304, to slide along the pivot 328 between the facing edges 334 of the pivot carriers 330, which act as stops to limit the movement of the barrel 332 and strike half 304 and thereby define the first slide position and the second slide position.

In the illustrated embodiment shown in FIGS. 3 to 16, pivotal movement of the strike half 304 relative to the mounting half 302 is independent of sliding movement of the strike half 304 relative to the mounting half 302. In other words, the strike half 304 can slide relative to the mounting half 302 without pivoting relative to the mounting half 302, and the strike half 304 can pivot relative to the mounting half 302 without sliding relative to the mounting half 302.

As best seen in FIGS. 4 and 6 to 10, in the particular exemplary embodiment shown in FIGS. 3 to 16, the strike half 304 has a plurality of locking fingers 336 extending from the distal sidewall 338 of the strike half 304, that is, the sidewall 338 that is distal from the pivot-side sidewall 324 of the strike half 304. The locking fingers 336 are longitudinally spaced apart from one another along the distal sidewall 338 of the strike half 304 so as to define locking finger gaps 340 between each adjacent pair of locking fingers 336. As used herein, the term "longitudinally" refers to the sliding motion of the strike half 304 relative to the mounting half 302.

Figure 7:
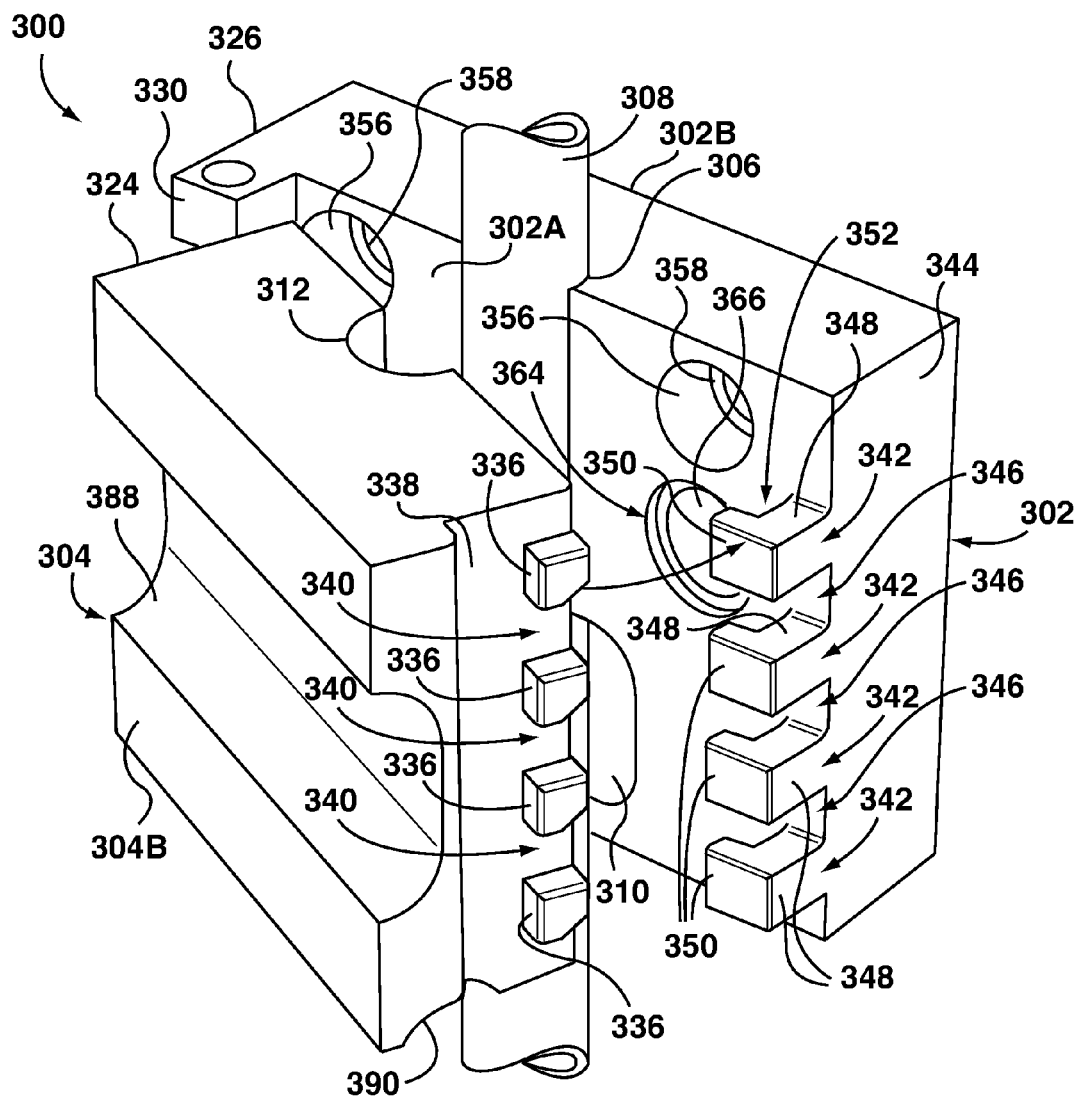
FIG. 7 is a top perspective view of the housing of FIG. 3, showing the housing moving between an open and a closed configuration.

The mounting half 302 has a plurality of latch arms 342 extending from the tube-receiving face 302A of the mounting half 302, adjacent the distal sidewall 344 thereof, that is, the sidewall 344 distal from the pivot-side sidewall 326 of the mounting half 302. Similarly to the locking fingers 336, the latch arms 342 are spaced longitudinally apart from one another so as to define latch arm gaps 346 between each adjacent pair of latch arms 342. As best seen in FIGS. 6 and 7, the latch arms 342 are each generally L-shaped and comprise a spacer portion 348 extending from the tube-receiving face 302A of the mounting half 302 and a retaining portion 350 extending from the outer end of the spacer portion 348 toward the pivot-side sidewall 326 of the mounting half 302. Each latch arm 342 thereby forms a receiving slot 352 between the retaining portion 350 and the tube-receiving face 302A of the mounting half 302 for receiving a respective locking finger 336.

Figure 9:
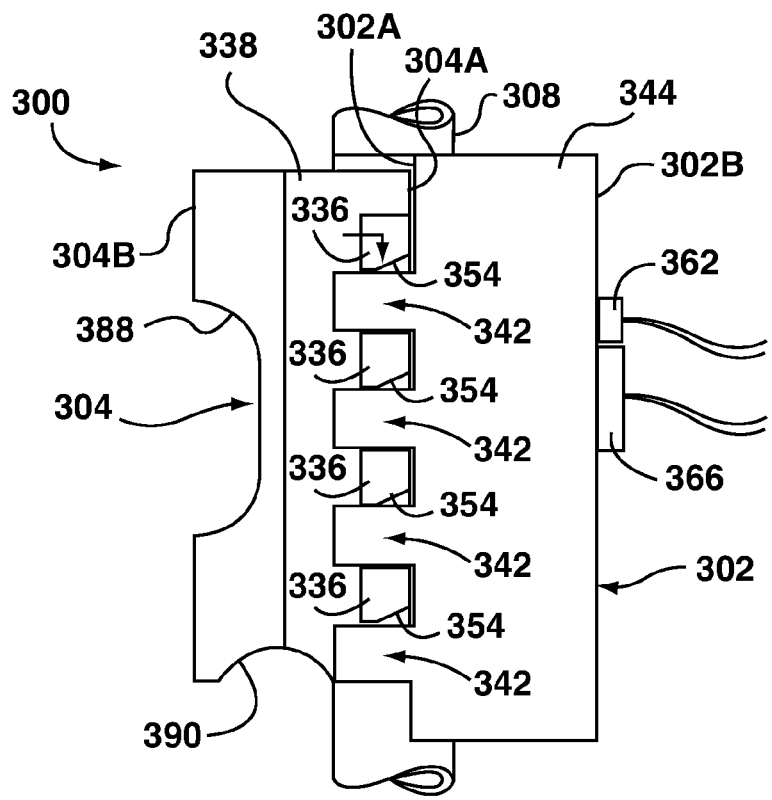
FIG. 9 is the same side view as in FIG. 8, showing the housing in a closed and unlocked configuration.
Figure 10:
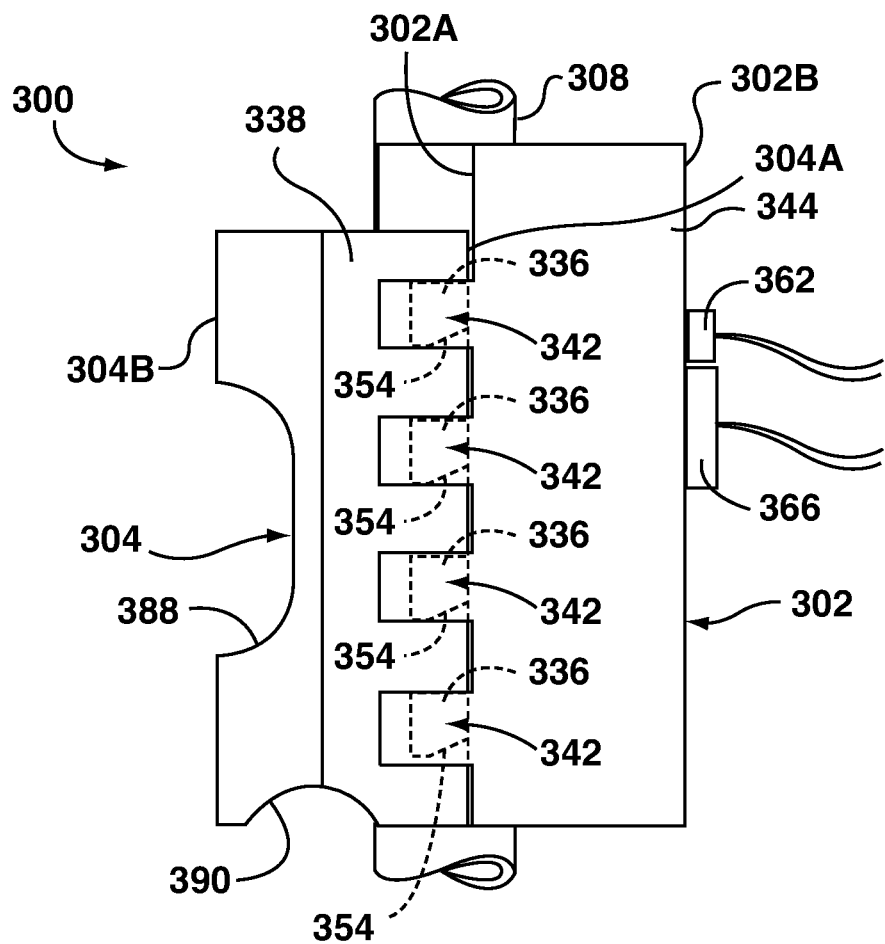
FIG. 10 is the same side view as in FIG. 8, showing the housing in a closed and locked configuration.
Figure 13:
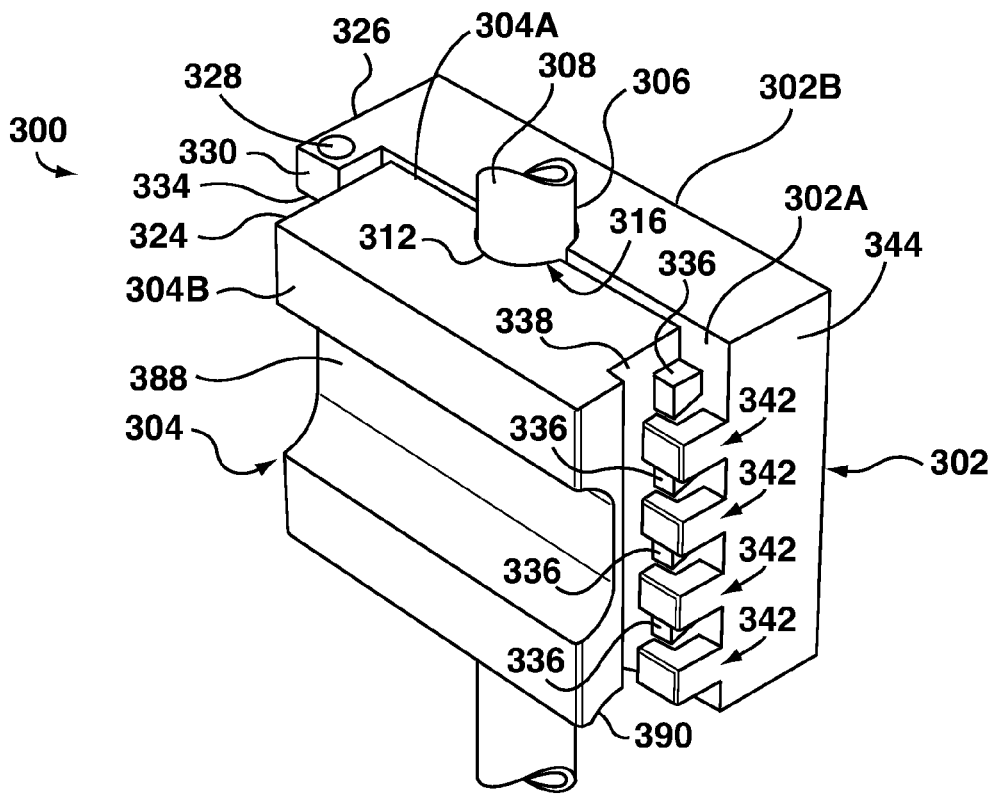
FIG. 13 is the same perspective view as in FIG. 4, showing the housing in a closed and unlocked configuration.

As shown in FIGS. 4, 10 and 14, when the strike half 304 is in the first pivotal position and the first slide position, each locking finger 336 is in registration with its respective latch arm 342, inside the receiving slot 352 formed by the respective latch arm 342. This is the closed and locked configuration (FIGS. 3, 4, 10, 12 and 14 to 16), and in this configuration each latch arm 342, in particular the retaining portion 350 thereof, engages its respective locking finger 336 to obstruct movement of the strike half 304 from the first pivotal position toward the second pivotal position. Conversely, as shown in FIGS. 9 and 13, when the strike half 304 is in the first pivotal position and the second slide position, each locking finger 336 is out of registration with its respective latch arm 342, and hence outside of the receiving slot 352 formed by the respective latch arm 342. This is the closed and unlocked configuration (FIGS. 9, 11 and 13). In this closed and unlocked configuration, the retaining portions 350 of the latch arms 342 do not engage the respective locking fingers 336, and therefore movement of the strike half 304 from the first pivotal position toward the second pivotal position is permitted.

Figure 8:
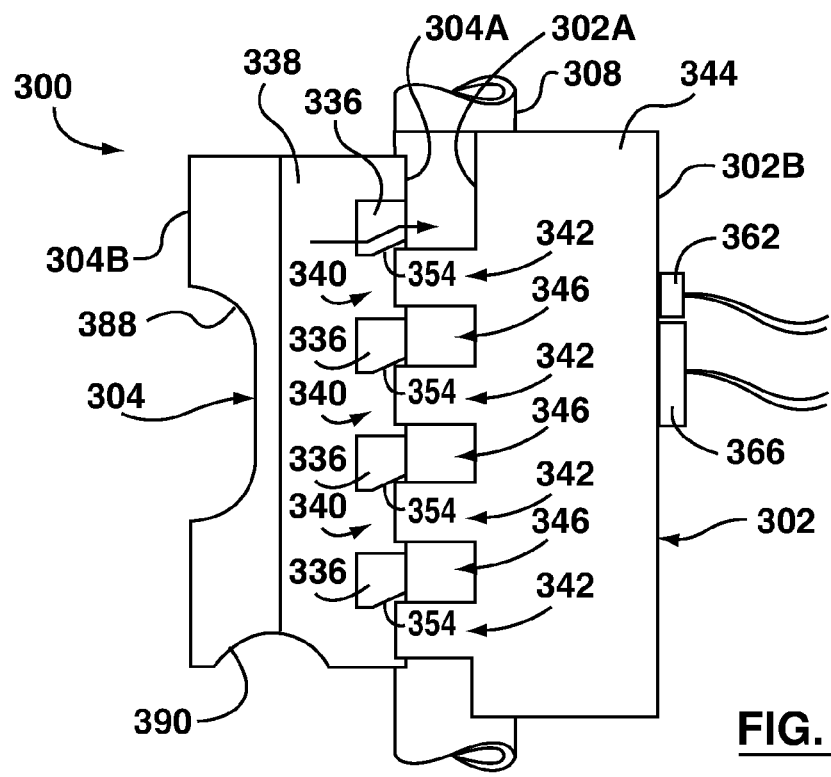
FIG. 8 is a first side view of the housing of FIG. 3, showing the housing moving toward a closed configuration.

As can be seen by reference to FIGS. 8 and 9, when the strike half 304 moves between the first pivotal position and the second pivotal position while in the second slide position, each of the upper three latch arms 342 fits in a corresponding locking finger gap 340, and each of the lower three locking fingers fits in a corresponding latch arm gap 346. As best shown in FIG. 8, the underside of each of the locking fingers 336 forms a tapered guide surface 354 that slopes generally upwardly toward the tube-receiving face 304A of the strike half 304. As the strike half 304 moves into the first pivotal position, it may be not be precisely in the second slide position, i.e. the strike half 304 may be slightly lower than the second slide position, so that the locking fingers 336 are not in registration with the latch arm gaps 346. In this case, the tapered guide surfaces 354 will engage the retaining portions 350 of the corresponding latch arms 342 and guide the strike half 304 upwardly into the second slide position as the strike half 304 moves into the first pivotal position.

Instead of providing tapered guide surfaces on the undersides of the locking fingers, or in addition thereto, the upper surfaces of the retaining portions may comprise tapered guide surfaces sloping upwardly toward the tube-receiving face 302A of the mounting half 302. Similarly, in alternate embodiments the strike half may have the latch arms and the mounting half may have the locking fingers.

To facilitate locking and unlocking of the housing 300, the strike half 304 should be slidable along the pivot 328 between the first slide position and the second slide position at least when the strike half 304 is in the first pivotal position. In the illustrated embodiment shown in FIGS. 3 to 16, the strike half 304 is slidable along the pivot 328 between the first slide position and the second slide position at any pivotal position of the strike half 304 relative to the mounting half 302.

It is contemplated that in other embodiments (not shown), the strike half may only be able to slide between the first and second slide positions when the strike half is in or nearly in the first pivotal position. In one exemplary implementation, the pivot carrier that is lowermost when the housing is in an upright position may include a projecting portion extending toward the barrel to define a partial shoulder, and the end of the barrel closest to that pivot carrier may include a corresponding recess. In such an implementation, sliding of the barrel, and hence the strike half, would only be permitted when the projecting portion and recess were in registration with one another; when the projecting portion and recess were out of registration the shoulder on the projecting portion would engage the non-recessed part of the end of the barrel to prevent sliding of the barrel along the pivot and thereby prevent any substantial sliding of the strike half relative to the mounting half. Accordingly, by arranging the projecting portion and recess so that they will only be in registration when the strike half is in or nearly in the first pivotal position, the projecting portion will engage the end of the barrel to maintain the strike half in the second slide position unless the strike half is in or nearly in the first pivotal position. When the strike half is in or nearly in the first pivotal position, the projecting portion and recess will be in registration so that the projecting portion on the lowermost pivot carrier is received in the recess as the barrel slides toward that pivot carrier to enable the strike half to slide from the second slide position to the first slide position. Such an arrangement could also be constructed to prevent or inhibit the access portion from pivoting from the first pivotal position to the second pivotal position unless the access portion were in the second slide position, by arranging the projecting portion and the recess so that a side of the projecting portion would engage a side of the recess so as to block pivoting unless the access portion is in the second slide position.

Operation of a metering dispenser incorporating a housing as described herein, such as the housing 300, is similar to operation of a metering dispenser incorporating the prior art housing 14. Reference is now made to FIGS. 15 and 16, which show the exemplary housing 300 in the closed and locked configuration with a dispensing tube 308 installed therein together with a solenoid plunger 380. The exemplary solenoid plunger 380 shown in FIGS. 15 and 16 is of the type shown and described in U.S. patent application Ser. No. 12/880,016, to which the present application claims priority (published as US2012/0061599A1) and corresponding Canadian Patent Application No. 2714916, the teachings of each of which are hereby incorporated by reference. As with the illustration of the prior art housing 14 and prior art solenoid plunger 16, in FIGS. 15 and 16 the other components of the metering dispenser, such as the solenoid itself, related control systems, the support structure and other elements, have been omitted for clarity of illustration as these elements and their placement will be apparent to one skilled in the art.

FIG. 15 shows solenoid plunger 380 in the "resting" or "closed" position, in which the closure member 382 on the plunger head 384 is received in the plunger aperture 310 in the mounting half 302 of the housing 300, compressing the dispensing tube 308 and pinching it against the plunger strike surface 314, thereby inhibiting material flow past the closure member 382. The solenoid plunger 380 may be maintained in this position by, for example, a suitable biasing member such as a spring (not shown). To dispense material, the solenoid (not shown) is actuated to move the solenoid plunger 380 into the "active" or "open" position, as shown in FIG. 16, for a fixed period of time before disengaging the solenoid and allowing the solenoid plunger 380 to return to the "rest" or "closed" position shown in FIG. 15. While the solenoid plunger 380 is in the "active" or "open" position (FIG. 16), the dispensing tube 308 is unobstructed, enabling a predetermined volume of liquid or granular material to move past the position of the solenoid plunger 380 before the solenoid plunger 380 returns to the "rest" or "closed" position (FIG. 15), again obstructing the dispensing tube 308.

When the reservoir is empty and must be replaced, the user first moves the strike half 304 from the closed and locked configuration (FIGS. 3, 4, 10, 12 and 14 to 16) to the closed and unlocked configuration (FIGS. 9, 11 and 13) by sliding the strike half 304 upwardly along the pivot 328 from the first slide position to the second slide position. With the strike half 304 in the second slide position, the user pivots the strike half 304 from the first pivotal position through the intermediate pivotal position shown in FIG. 7 to the second pivotal position, thereby placing the housing 300 in an open configuration (FIGS. 5 and 6). This enables the dispensing tube 308 of the empty reservoir to be replaced with the dispensing tube 308 of the new reservoir. When the housing 300 is installed, the strike half 304 will be biased toward the first slide position by gravity, especially when it is made of metal and can slide smoothly along the pivot 328. At any time after the locking fingers 336 are clear of the latch arms 342, the user can allow the strike half 304 to slide under gravity from the second slide position to the first slide position, or alternatively can hold the strike half 304 in the second slide position while replacing the dispensing tube 308. Once the reservoir and flexible dispensing tube 308 have been replaced, the user then pivots the strike half 304 from the second pivotal position through the intermediate pivotal position shown in FIG. 7 toward the first pivotal position and, if the user has not held the strike half 304 in the second slide position, slides the strike half 304 into the second slide position. This enables the upper three latch arms 342 to enter the corresponding locking finger gaps 340 while the lower three locking fingers 336 enter the corresponding latch arm gaps 346. Thus, when the strike half 304 reaches the first pivotal position, the strike half 304 will be in the second slide position and therefore in the closed and unlocked configuration (FIGS. 9, 11 and 13). The user can then either manually move the strike half 304 into the first slide position or, where the strike half is heavy enough and can slide smoothly along the pivot 328, the user can simple release the strike half 304 and allow it to fall into the first slide position under gravity, in either case returning the housing to closed and locked configuration (FIGS. 3, 4, 10, 12 and 14 to 16). To enable the strike half 304 to fall into the first slide position under gravity to transition from the closed and unlocked configuration to the closed and locked configuration, the clearance between the locking fingers 336 and the receiving slots 352 formed by the latch arms should be sufficient to enable the strike half 304 to fall smoothly into place. The strike half 304 includes an upper grip recess 388 in its outer face 304B and a lower grip recess 390 defined in the lower edge of the strike half 304 to assist a user in grasping and moving the strike half 304.

Referring now to FIGS. 5 and 6, a pair of mounting bores 356 are defined through the mounting half 302 on either side of the mounting half tube channel 306. The mounting bores 356 each include an intermediate annular shoulder 358 (FIG. 7) and can receive a bolt (not shown) for securing the mounting half 302 to a metering dispenser, as is known in the art.

A temperature sensor aperture 360 (FIG. 5) is also defined through the mounting half 302, in the mounting half tube channel 306 above the plunger aperture 310, for receiving a thermistor 362 or other temperature sensor. Where the mounting half 304 is made from aluminum or another suitable material having good thermal conductivity, the need for an insert made from such material is obviated.

In addition, as best seen in FIG. 6, a closure sensor aperture 364 is defined through the mounting half 302 for receiving a closure sensor, such as the illustrated reed switch 366 which detects a rare earth magnet (not shown) held by a bolt or screw 370 in a correspondingly positioned magnet aperture 368 defined in the tube receiving face 304A of the strike half 304. The closure sensor aperture 364 and the closure sensor 366 may be positioned on either side of the housing.

Certain currently preferred embodiments have been described by way of example. It will be apparent to persons skilled in the art that a number of variations and modifications can be made without departing from the scope of the claims. The above description is intended in an illustrative rather than a restrictive sense. Variations to the exact embodiments described may be apparent to those skilled in the relevant art without departing from the spirit and scope of the claims set out below. It is intended that any such variations be deemed within the scope of this patent.

What is claimed is:

1. A housing for a dispensing tube of a metering dispenser, comprising:
 a mounting half for mounting the housing to a metering dispenser;

a strike half for receiving plunger strikes;

the strike half carried by the mounting half;

the mounting half having a mounting half tube channel defined therein for receiving a dispensing tube;

the mounting half having a plunger aperture defined through the mounting half tube channel for receiving a plunger;

the strike half having a plunger strike surface;

the strike half being pivotally carried by the mounting half so as to be pivotable, relative to the mounting half, between:
- a first pivotal position in which the strike half at least partially covers the mounting half tube channel; and
- a second pivotal position in which the strike half exposes the mounting half tube channel; and the strike half further being slidably carried by the mounting half so as to be slidable relative to the mounting half, at least when the strike half is in the first pivotal position, between:
- a first slide position in which pivotal movement of the strike half relative to the mounting half from the first pivotal position toward the second pivotal position is obstructed; and
- a second slide position in which pivotal movement of the strike half relative to the mounting half from the first pivotal position toward the second pivotal position is permitted;

wherein, at least when the strike half is in the first pivotal position and in the first slide position, the plunger strike surface is in registration with and facing the plunger aperture to receive a plunger head, wherein the strike half is hingedly carried by the mounting half by way of a pivot extending between the mounting half and the strike half and on which the strike half is rotatably received so as to be rotatable about the pivot between the first pivotal position and the second pivotal position, and wherein the strike half further being slidable along the pivot, at least when the strike half is in the first pivotal position, between the first slide position and the second slide position.

2. The housing of claim 1, wherein:

one of the mounting half and the strike half has at least one locking finger;

the other one of the mounting half and the strike half has at least one latch arm extending therefrom;

each latch arm forming a receiving slot for receiving a respective locking finger;

wherein:
when the strike half is in the first pivotal position and the first slide position, each locking finger is in registration with its respective latch arm, inside the receiving slot formed by the respective latch arm, so that each latch arm engages its respective locking finger to obstruct movement of the strike half from the first pivotal position to the second pivotal position; and when the strike half is in the first pivotal position and the second slide position, each locking finger is out of registration with its respective latch arm and outside of the receiving slot formed by the respective latch arm whereby movement of the strike half from the first pivotal position toward the second pivotal position is permitted.

3. The housing of claim 2, wherein:

the at least one locking finger comprises a plurality of locking fingers spaced longitudinally apart from one another to define a locking finger gap between each adjacent pair of locking fingers;

the at least one latch arm comprises a plurality of latch arms spaced longitudinally apart from one another to define a latch arm gap between each adjacent pair of latch arms;

wherein, when the strike half moves between the first pivotal position and the second pivotal position while in the second slide position:
- at least one latch arm fits in a corresponding locking finger gap; and
- at least one locking finger fits in a corresponding locking arm gap.

4. The housing of claim 2, wherein each of at least one of the at least one locking finger and the at least one latch arm has a tapered guide surface for guiding the strike half into the second slide position as the strike half moves into the first pivotal position.

5. The housing of claim 1, wherein the strike half has a strike half tube channel defined therein;

the strike half tube channel cooperating with the mounting half tube channel, when the strike half is in the first pivotal position, to form a dispensing tube channel.

* * * * *